United States Patent
Yoshimura

(10) Patent No.: US 10,590,966 B2
(45) Date of Patent: Mar. 17, 2020

(54) METHOD FOR GENERATING MECHANICAL AND ELECTROCHEMICAL CAVITATION, METHOD FOR CHANGING GEOMETRIC SHAPE AND ELECTROCHEMICAL PROPERTIES OF SUBSTANCE SURFACE, METHOD FOR PEELING OFF RARE METAL, MECHANICAL AND ELECTROCHEMICAL CAVITATION GENERATOR, AND METHOD FOR GENERATING NUCLEAR FUSION REACTION OF DEUTERIUM

(71) Applicant: TOKYO UNIVERSITY OF SCIENCE FOUNDATION, Tokyo (JP)

(72) Inventor: Toshihiko Yoshimura, Tokyo (JP)

(73) Assignee: SANYO-ONODA CITY PUBLIC UNIVERSITY CORPORATION, Yamaguchi (JP)

( * ) Notice: Subject to any disclaimer, the term of this patent is extended or adjusted under 35 U.S.C. 154(b) by 106 days.

(21) Appl. No.: 15/552,777

(22) PCT Filed: Feb. 22, 2016

(86) PCT No.: PCT/JP2016/055016
§ 371 (c)(1),
(2) Date: Aug. 22, 2017

(87) PCT Pub. No.: WO2016/136656
PCT Pub. Date: Sep. 1, 2016

(65) Prior Publication Data
US 2018/0274569 A1  Sep. 27, 2018

(30) Foreign Application Priority Data
Feb. 24, 2015  (JP) .................................. 2015-034142

(51) Int. Cl.
*F15D 1/00* (2006.01)
*B23P 17/00* (2006.01)
(Continued)

(52) U.S. Cl.
CPC ............... *F15D 1/00* (2013.01); *B23P 17/00* (2013.01); *B23P 17/04* (2013.01); *G21B 3/00* (2013.01);
(Continued)

(58) Field of Classification Search
CPC combination set(s) only.
See application file for complete search history.

(56) References Cited

U.S. PATENT DOCUMENTS 5,368,054 A    11/1994  Koretsky et al.
2014/0263093 A1*  9/2014  Sprague .................... C02F 1/34
                                                210/748.16

FOREIGN PATENT DOCUMENTS

JP    7-201799 A      8/1995
JP    2006-255865 A   9/2006
(Continued)

OTHER PUBLICATIONS

Y. Toriyabe et al.; "Acceleration of the d+d reaction in metal lithium acoustic cavitation with deuteron bombardment from 30 to 70 keV"; Physical Review C; May 24, 2012; Phys. Rev. C85, 054620.
(Continued)

*Primary Examiner* — Erin F Bergner
(74) *Attorney, Agent, or Firm* — Kenealy Vaidya LLP

(57) ABSTRACT

Provided are a method for generating mechanical and electrochemical cavitation, a method for changing the geometric shape and the electrochemical properties of a surface of a substance, a method for peeling off a rare metal using the generated mechanical and electrochemical cavitation, a mechanical and electrochemical cavitation generator, and a
(Continued)

method for generating a nuclear fusion reaction of deuterium. In the method for generating mechanical and electrochemical cavitation, a water jet is jetted from a jetting nozzle immersed in water, and flow cavitation generated by the jetting of the water jet is irradiated with an ultrasonic wave to generate cavitation MFC having both a functional effect and an electrochemical effect.

8 Claims, 10 Drawing Sheets

(51) Int. Cl.
*G21B 3/00* (2006.01)
*B23P 17/04* (2006.01)
*B08B 3/10* (2006.01)
*B08B 3/12* (2006.01)

(52) U.S. Cl.
CPC .............. *G21B 3/008* (2013.01); *B08B 3/102* (2013.01); *B08B 3/12* (2013.01); *Y02E 30/10* (2013.01)

(56) References Cited

FOREIGN PATENT DOCUMENTS

| | | |
|---|---|---|
| JP | 2007-59318 A | 3/2007 |
| JP | 2009-90443 A | 4/2009 |
| JP | 2010-523985 A | 7/2010 |
| WO | 2008/124574 A1 | 10/2008 |

OTHER PUBLICATIONS

International Search Report for PCT/JP2016/055016 dated Apr. 5, 2016.

* cited by examiner

METHOD FOR GENERATING MECHANICAL AND ELECTROCHEMICAL CAVITATION, METHOD FOR CHANGING GEOMETRIC SHAPE AND ELECTROCHEMICAL PROPERTIES OF SUBSTANCE SURFACE, METHOD FOR PEELING OFF RARE METAL, MECHANICAL AND ELECTROCHEMICAL CAVITATION GENERATOR, AND METHOD FOR GENERATING NUCLEAR FUSION REACTION OF DEUTERIUM

This application is a U.S. national phase filing under 35 U.S.C. § 371 of PCT Application No. PCT/JP2016/055016, filed Feb. 22, 2016, and claims priority under 35 U.S.C. § 119 to Japanese patent application number JP2015-034142 filed on Feb. 24, 2015, the entireties of which are incorporated herein by reference.

TECHNICAL FIELD

The present invention relates to a method for generating mechanical and electrochemical cavitation, a method for changing the geometric shape and the electrochemical properties of a surface of a substance, a method for peeling off a rare metal, a mechanical and electrochemical cavitation generator, and a method for generating a nuclear fusion reaction of deuterium.

BACKGROUND ART

The usefulness and safety of nuclear power generation, problems of radioactive contamination and the like have received attention particularly after the earthquake disaster. Effective utilization of renewable energy is essential for establishing a sustainable society which does not depend on fossil resources while reducing emissions of carbon dioxide in thermal power generation. Particularly, utilization of solar energy, which is the most dominant in renewable energy, is very important, but the utilization techniques of solar energy are limited. Examples of the technique that utilizes solar energy include solar photovoltaic power generation, solar heat, biomass and artificial photosynthesis.

Hydrogen can be converted into clean energy that does not emit carbon dioxide. Hydrogen reacts with oxygen to generate electric power, heat and water. Hydrogen produces energy with high efficiency, and is used in a wide range of applications including fuels for automobiles and power generation equipment. A solar light hydrogen production technique for producing hydrogen and oxygen by directly decomposing water using a photocatalyst and a photoelectrode including an oxide semiconductor is inexpensive, and studies on the solar light hydrogen production technique are actively promoted for realization of a future hydrogen energy-based society.

In the field of photocatalysts, various photocatalyst materials (oxide semiconductors) are studied. Titanium oxide is inexpensive, and the application of titanium oxide to a solar energy conversion material as a material of a photoelectrode and a photocatalyst receives attention. A $TiO_2$ photocatalytic reaction has such a characteristic that light (ultraviolet light) having a wavelength of 350 nm is effective for the reaction. However, solar light includes only a small amount of ultraviolet light, and for efficient energy conversion, it is absolutely necessary to utilize visible light, which contains half of solar energy. Studies for modifying titanium oxide to impart visible light responsiveness thereto are extensively conducted, and studies for reforming a metal surface are also conducted (see Patent Document 1).

Patent Document 1: Japanese Unexamined Patent Application, Publication No. 2006-255865

DISCLOSURE OF THE INVENTION

Problems to be Solved by the Invention

However, conventional catalysts have a low ability to generate hydrogen. Thus, the efficiency of converting solar energy into hydrogen energy using a conventional photocatalyst material and photoelectrode material is low, and the development of a high-performance system is desired.

The present invention relates to a method for generating mechanical and electrochemical cavitation, a method for changing the geometric shape and the electrochemical properties of a surface of a substance, a method for peeling off a rare metal using the generated mechanical and electrochemical cavitation, a mechanical and electrochemical cavitation generator, and a method for generating a nuclear fusion reaction of deuterium.

Means for Solving the Problems

An invention as set forth in claim 1 is a method for generating mechanical and electrochemical cavitation, the method including: jetting a water jet from a jetting nozzle immersed in water; and applying an ultrasonic wave to flow cavitation, which is generated by the jetting of the water jet, at a position where the flow cavitation is expandable and the flow velocity of the flow cavitation is equal to or less than a predetermined moving velocity, and distributing high-temperature reaction fields, which are included in the flow cavitation and generated by repeated expansion/shrinkage resulting from the application of the ultrasonic wave, in such a manner that the high-temperature reaction fields are situated away from the jetting nozzle.

An invention as set forth in claim 2 is the method according to claim 1, wherein the moving velocity of the flow cavitation is 5 m/s or less.

An invention as set forth in claim 3 is the method according to claim 1, wherein the frequency of the ultrasonic wave is 20 kHz or more and 33 kHz or less.

An invention as set forth in claim 4 is the method according to claim 1 or 2, wherein the distance between an ultrasonic wave applying element for applying the ultrasonic wave and the water jet is equal to or less than five times the wavelength of the ultrasonic wave.

An invention as set forth in claim 5 is the method according to any one of claims 1 to 4, wherein by applying the ultrasonic wave to flow cavitation of a secondary jet flow generated on the periphery of a collision object by the water jet jetted from the jetting nozzle colliding with the collision object, high-temperature reaction fields included in the flow cavitation are generated on the periphery of the collision object.

An invention as set forth in claim 6 is a method for changing the geometric shape and the electrochemical properties of a surface of a substance by colliding mechanical and electrochemical cavitation, which is generated by the method for generating mechanical and electrochemical cavitation according to any one of claims 1 to 5, with the substance.

An invention as set forth in claim 7 is the method according to claim 6, wherein the substance includes at least one selected from titanium oxide having a crystal structure of rutile type or anatase type, platinum and nickel oxide, with particles of the titanium oxide having a particle size of 100 nm or more and 400 nm or less, and particles of the platinum or the nickel oxide having a particle size of 0.1 μm or more and 85 μm or less.

An invention as set forth in claim 8 is the method according to claim 6, wherein an inactive surface having low gas adsorption, and high oxidation resistance and corrosion resistance is generated as the surface of the substance.

An invention as set forth in claim 9 is a method for peeling off a rare metal from a surface of a covered material by colliding mechanical and electrochemical cavitation, which is generated by the method for generating mechanical and electrochemical cavitation according to any one of claims 1 to 5, with the surface of the covered material on which the rare metal is deposited.

An invention as set forth in claim 10 is a mechanical and electrochemical cavitation generator including: a jetting nozzle for jetting a water jet, the jetting nozzle being immersed in water; and an ultrasonic wave applying element for applying an ultrasonic wave to flow cavitation, which is generated by the jetting of the water jet, at a position where the flow cavitation is expandable and the flow velocity of the flow cavitation is equal to or less than a predetermined moving velocity, and distributing high-temperature reaction fields, which are included in the flow cavitation and generated by repeated expansion/shrinkage resulting from the application of the ultrasonic wave, in such a manner that the high-temperature reaction fields are situated away from the jetting nozzle.

An invention as set forth in claim 11 is a method for generating a nuclear fusion reaction of deuterium, the method including: jetting heavy water or a deuterium-containing liquid from a jetting nozzle immersed in heavy water or a deuterium-containing liquid; and applying an ultrasonic wave to flow cavitation, which is generated by the jetting of the heavy water or deuterium-containing liquid, at a position where the flow cavitation is expandable and the flow velocity of the flow cavitation is equal to or less than a predetermined moving velocity, and distributing high-temperature reaction fields, which are included in the flow cavitation and generated by repeated expansion/shrinkage resulting from the application of the ultrasonic wave, in such a manner that the high-temperature reaction fields are situated away from the jetting nozzle; and generating a nuclear fusion reaction of deuterium by collapse of the cavitation.

EFFECTS OF THE INVENTION

According to the present invention, a method for generating mechanical and electrochemical cavitation, a method for changing the geometric shape and the electrochemical properties of a surface of a substance, and a method for peeling off a rare metal using the generated mechanical and electrochemical cavitation can be provided.

PREFERRED MODE FOR CARRYING OUT THE INVENTION

Hereinafter, embodiments of a method for generating mechanical and electrochemical cavitation according to the present invention will be described. First, embodiment 1 will be described.

(Embodiment 1)

Figure 1:
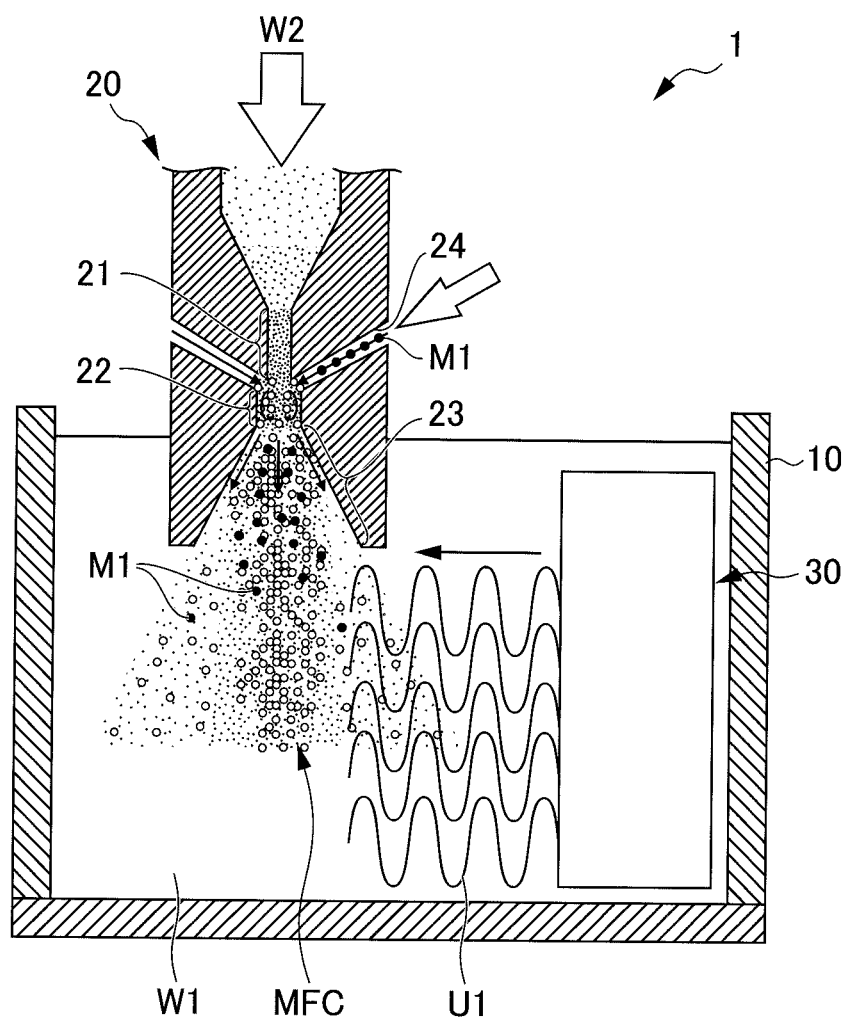
FIG. 1 is a schematic view showing a method for generating mechanical and electrochemical cavitation MFC in embodiment 1 according to the present invention.

FIG. 1 is a schematic view showing a method for generating mechanical and electrochemical cavitation MFC in embodiment 1 according to the present invention.

A mechanical and electrochemical cavitation generator 1 for carrying out the method for generating mechanical and electrochemical cavitation includes a reactor 10, a jetting nozzle 20 and an ultrasonic wave applying element 30 as shown in FIG. 1. The reactor 10 stores tap water W1.

The jetting nozzle 20 is connected to a high-pressure water supply source (not illustrated). A discharge port of the jetting nozzle 20 is immersed in the tap water W1 stored in the reactor 10. High-pressure water W2 supplied from a high-pressure supply source (not illustrated) is jetted as a high-pressure water jet from the discharge port into the tap water W1 stored in the reactor 10. The pressure of the high-pressure water W2 is 1 MPa or more and 70 MPa or less.

When the pressure of the high-pressure water W2 is less than 1 MPa, a properly high-pressure water jet cannot be obtained, and thus a nucleus of mechanical and electrochemical cavitation (hereinafter, referred to as "multifunction cavitation MFC") is hard to generate, so that multifunction cavitation MFC cannot be properly obtained. When the pressure of the high-pressure water W2 is more than 70 MPa, the pressure of the water jet is so high that it is difficult to expand the nucleus of multifunction cavitation MFC, and therefore multifunction cavitation MFC cannot be properly obtained. Particularly, when the pressure of the high-pressure water W2 is 3 MPa or more, a water jet for easily generating multifunction cavitation MFC can be jetted. Here, the "mechanical and electrochemical cavitation (multifunction cavitation MFC)" means cavitation capable of having not only a mechanical surface reforming effect of changing the geometric shape of a surface of a substance, for example making a surface of a substance such as titanium oxide porous, but also an electrochemical surface reforming effect of, for example, reducing band gap in decomposition of water into hydrogen and oxygen.

The jetting nozzle 20 includes an orifice section 21, a mixing chamber 22 and a horn section 23. The orifice section 21 includes a cylindrical shape. An end of the orifice section 21 on the upstream side communicates with a high-pressure water supply source (not illustrated). The high-pressure water W2 supplied from the high-pressure water supply source (not illustrated) flows into the orifice section 21.

An end of the mixing chamber 22 on the upstream side is connected to an end of the orifice section 21 on the downstream side. The mixing chamber 22 has a diameter slightly larger than the diameter of the orifice section 21, and a substance inflow channel 24 having an inner diameter of about 1 mm to 4 mm communicates with the mixing chamber 22. The high-pressure water W2 flows into the mixing chamber 22 from the orifice section 21, and also a powder of titanium oxide ($TiO_2$) and a powder M1 of platinum (Pt) or nickel (II) oxide (NiO) flow into the mixing chamber 22 with a sub-flow passing through the substance inflow channel 24.

The titanium oxide flowing into the mixing chamber 22 with the sub-flow passing through the substance inflow channel 24 has a crystal structure of rutile type or anatase type. Particles of the titanium oxide have a particle size of 10 μm or less, preferably 100 nm or more and 400 nm or less. When the particle size is more than 10 μm, the particle size is so large that it is difficult to perform surface reforming such that the surfaces of particles of the titanium oxide are made fine to have a porous structure. The particle size of the titanium oxide is preferably small for efficiently performing surface reforming, and the particle size of the titanium oxide is preferably 400 nm or less for more efficiently performing surface reforming. When the particle size of particles of the titanium oxide is less than 100 nm, the particle size of particles is so small that it is difficult to efficiently perform surface reforming. Particles of the platinum or nickel (II) oxide have a particle size of 0.1 μm or more and 85 μm or less. As in the case of the titanium oxide, the particle size of particles of the platinum or nickel (II) oxide is preferably small for efficiently performing surface reforming. When the particle size of the platinum or nickel (II) oxide is more than 85 μm, it is difficult to efficiently perform surface reforming of the platinum or nickel (II) oxide. When the particle size of the platinum or nickel (II) oxide is less than 0.1 μm, the particle size of particles is so small that it is difficult to efficiently perform surface reforming such that the surfaces of particles are made fine to have a porous structure.

An end of the horn section 23 on the upstream side is connected to An end of the mixing chamber 22 on the downstream side. The horn section 23 increases its diameter in a tapered form toward the tip of the horn section 23 (the discharge port of the jetting nozzle 20 which is formed by an end of the horn section 23 on the downstream side). Therefore, the jetting nozzle 20 is formed by a horn nozzle. The maximum diameter of the tip of the horn section 23 is about 0.8 mm to 2 mm. The jetting nozzle 20 having a configuration as described above jets a water jet into the tap water W1 stored in the reactor 10, and accordingly flow cavitation is generated in the tap water W1.

The ultrasonic wave applying element 30 is electrically connected to a drive controller (not illustrated), and applies an ultrasonic wave U1 to a vertically and downwardly jetted water jet in a horizontal direction. The output from the drive controller causes the ultrasonic wave applying element 30 to apply the ultrasonic wave U1 in the tap water W1 stored in the reactor 10. The frequency of the applied ultrasonic wave U1 is 20 kHz or more and 33 kHz or less.

When the frequency of the applied ultrasonic wave U1 is less than 20 kHz, the frequency is so low that the effect of the ultrasonic wave U1 cannot be obtained. When the frequency of the applied ultrasonic wave U1 is more than 100 kHz, the frequency is so high that the effect of the ultrasonic wave U1 cannot be obtained, and when the frequency of the applied ultrasonic wave U1 is more than 33 kHz, the bubble radius is far from a resonance radius at which the bubble radius is easily isothermally expanded/adiabatically compressed, and thus it is difficult to isothermally expand/adiabatically compress the bubble radius. More preferably, the frequency is around 28 kHz. A relationship between the bubble radius and the frequency of the ultrasonic wave U1 will be described later.

The ultrasonic wave output rated value of the applied ultrasonic wave U1 is 100 W or more and 300 W or less. When the ultrasonic wave output rated value of the applied ultrasonic wave U1 is less than 100 W, the output of the ultrasonic wave U1 is so low that pressure collapse by expansion/shrinkage of the nucleus of cavitation cannot be sufficiently performed. When the ultrasonic wave output rated value of the applied ultrasonic wave U1 is more than 300 W, expansion of the nucleus of cavitation, and pressure collapse by shrinkage cannot be effectively performed despite that the output of the ultrasonic wave U1 is high, and it is meaningless to increase the output. The radius that gives the resonant frequency of bubble oscillation (oscillation to the nucleus of cavitation) is called a resonance radius, and when the sound pressure (ultrasonic wave output) is high, the nucleus of cavitation is not so much expanded, and Rayleigh shrinkage (adiabatic compression) does not occur at a bubble radius equal to or greater than the resonance radius. Expansion of bubbles is small even when the bubble radius is equal to or less than a bubble radius at which the sound pressure is a Blake threshold (a sound pressure required for isothermal expansion). Thus, the equilibrium radius of active bubbles that cause Rayleigh shrinkage generally falls between the Blake threshold and the resonance radius.

The ultrasonic wave applying element 30 is disposed away from the water jet jetted by the jetting nozzle 20 in the tap water W1 stored in the reactor 10, and the distance between the ultrasonic wave applying element 30 and the water jet is equal to or less than five times the wavelength of the ultrasonic wave U1. Specifically, when the frequency of the applied ultrasonic wave U1 is 28 kHz, the ultrasonic wave applying element 30 is disposed at a distance of about 54 mm or less from the water jet jetted from the jetting nozzle 20. When the distance is more than five times the wavelength of the ultrasonic wave U1 applied from the ultrasonic wave applying element 30, the intensity of the ultrasonic wave U1 is reduced, so that the nucleus of multifunction cavitation MFC does not turn from an expanded state to a shrunk state, and a sufficient substance surface reforming effect of multifunction cavitation MFC cannot be obtained.

The ultrasonic wave applying element 30 applies the ultrasonic wave U1 to flow cavitation situated away from the jetting nozzle 20 and situated at a position where the flow cavitation is expandable and the flow velocity of the flow cavitation is equal to or less than a predetermined moving velocity. Accordingly, high-temperature reaction fields of the flow cavitation including the high-temperature reaction fields are distributed away from the jetting nozzle 20. The predetermined moving velocity is 5 m/s.

The predetermined moving velocity is determined in the following manner. The minimum pressure required for expansion of the nucleus of cavitation is determined from the following formula:

$$p_{crit} = p_{B,min} = p_v - \frac{4\sigma}{3}\sqrt{\frac{2\sigma}{3R_0^3\left(p_0 + \frac{2\sigma}{R_0} - p_v\right)}} \quad [\text{Math. 1}]$$

where $p_v$ is water vapor pressure, $p_o$ is atmospheric pressure, $\sigma$ is surface tension, and $R_0$ is equilibrium radius. The condition for bubbles to considerably expand by overcoming the surface tension $\sigma$ is as shown below.

$$A \geq A_{Blake} = p_0 - p_{B,min} \quad [\text{Math. 2}]$$
$$= p_0 - p_v + \frac{4\sigma}{3}\sqrt{\frac{2\sigma}{3R_0^3\left(p_0 + \frac{2\sigma}{R_0} - p_v\right)}}$$

Figure 2:
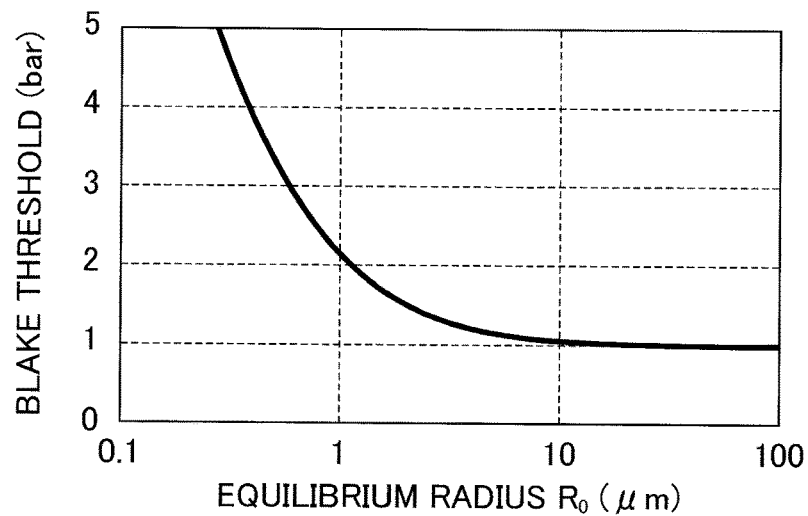
FIG. 2 is a graph showing a relationship between Blake threshold and equilibrium radius in the method for generating mechanical and electrochemical cavitation MFC in embodiment 1 according to the present invention.

When the frequency of the ultrasonic wave U1 is low (about 20 kHz), a relationship between the Blake threshold $A_{Blake}$ and the equilibrium radius $R_o$ is as shown in the graph in FIG. 2. FIG. 2 is a graph showing a relationship between the Blake threshold and the equilibrium radius in the method for generating mechanical and electrochemical cavitation MFC in embodiment 1 according to the present invention. The graph shown in FIG. 2 indicates that when the equilibrium radius is more than 1 μm, the Blake threshold is equal to 1 bar (atmospheric pressure), so that bubbles can be easily expanded. Here, in accordance with Bernoulli's law, the sound pressure required for expansion of bubbles is expressed by:

$$A_{Blake} = -\frac{\rho}{2}(v_0^2 - v^2) + \frac{4\sigma}{3}\sqrt{\frac{2\sigma}{3R_0^3\left(\frac{2\sigma}{R_0} - \frac{\rho}{2}(v_0^2 - v^2)\right)}} \quad [\text{Math. 3}]$$

where $\rho$ is liquid density, $v$ is liquid flow velocity, and $v_o$ is oscillation velocity.

Figure 3:
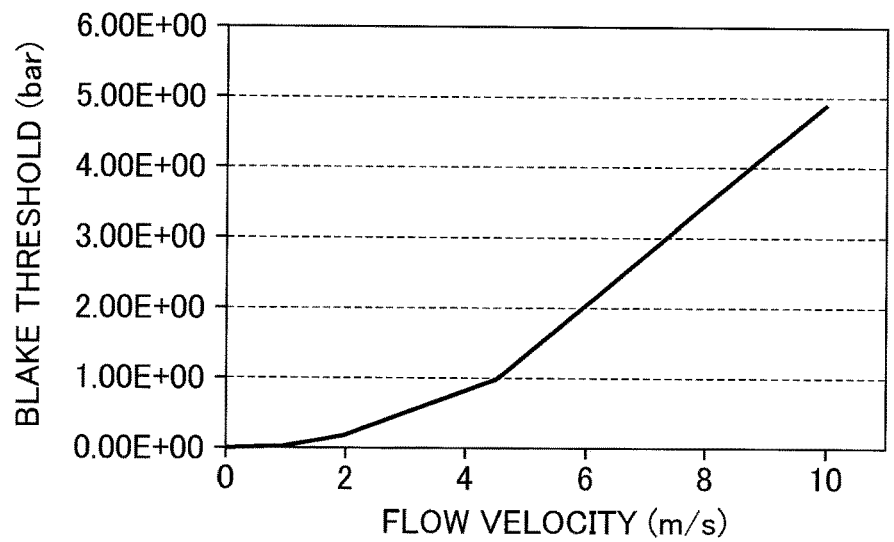
FIG. 3 is a graph showing a relationship between Blake threshold and flow velocity in the method for generating mechanical and electrochemical cavitation MFC in embodiment 1 according to the present invention.

When the bubble radius is 100 μm, a relationship between the Blake threshold $A_{Blake}$ and the flow velocity $v$ is as shown in the graph in FIG. 3. FIG. 3 is a graph showing a relationship between the Blake threshold and the flow velocity in the method for generating mechanical and electrochemical cavitation MFC in embodiment 1 according to the present invention. The graph shown in FIG. 3 indicates that when the flow rate $v$ is 4.52 m/s, the Blake threshold $A_{Blake}$ is equal to 1 bar at a position that is away from the nozzle. It is thus apparent that at a position where the liquid flow velocity, i.e. the flow velocity of flow cavitation is equal to or less than 5 m/s, the nucleus of cavitation can be expanded even when the sound pressure is low. As shown in FIG. 3, the Blake threshold $A_{Blake}$ starts to suddenly increase approximately at a position where the flow velocity of flow cavitation exceeds a predetermined moving velocity of 5 m/s, the Blake threshold $A_{Blake}$ increases as the flow velocity of the flow cavitation becomes higher with the flow cavitation approaching the jetting nozzle 20, and a high sound pressure is required for expanding the nucleus of the cavitation.

Assuming that spherical bubbles having a radius R sufficiently smaller than the wavelength of the ultrasonic wave oscillate at an oscillation velocity in water. When a plurality of bubbles oscillate without interacting with one another, the resonant frequency (resonance frequency) of bubble oscillation is given by the following Minnaert equation:

$$\omega_0 = \frac{1}{R_0}\sqrt{\frac{1}{\rho}\left(3\gamma p_0 + \frac{2\sigma}{R_0}(3\gamma - 1)\right)} \quad [\text{Math. 4}]$$

where ρ is water density, $P_0$ is atmospheric pressure, γ is specific heat ratio, and $R_0$ is bubble radius.

Figure 4:
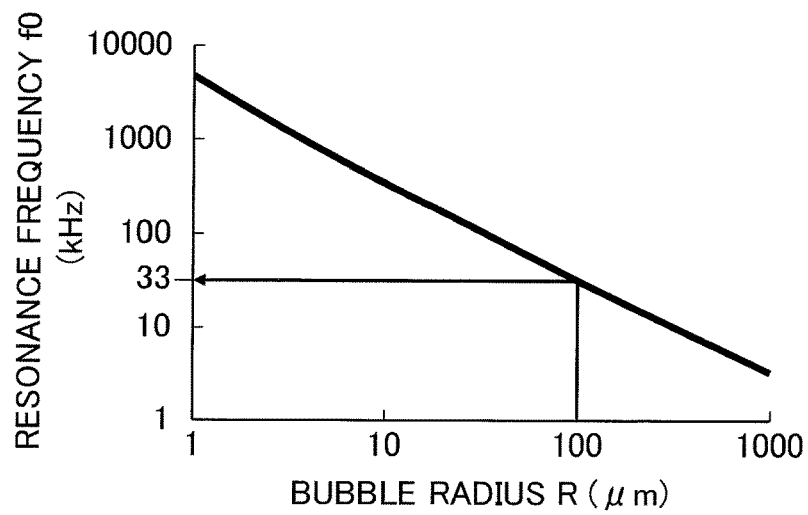
FIG. 4 is a graph showing a relationship between resonance frequency and bubble radius in the method for generating mechanical and electrochemical cavitation MFC in embodiment 1 according to the present invention.

The result of calculating the resonant frequency with $P_0$ set to $10^5$ Pa and γ set to 1.4 in the above formula is as shown in the graph in FIG. 4. FIG. 4 is a graph showing a relationship between the resonance frequency and the bubble radius in the method for generating mechanical and electrochemical cavitation MFC in embodiment 1 according to the present invention. It is considered that in a bubble having a size of 100 μm or more, which is the size of water jet cavitation, the resonant frequency is 33 kHz or less, and for example, when the frequency of the ultrasonic wave U1 applied from the ultrasonic wave applying element 30 is 28 kHz, the bubble is effectively expanded and activated.

The method for generating mechanical and electrochemical cavitation using the apparatus 1 having the foregoing configuration is carried out in the following manner. The jetting nozzle 20, which is immersed in the tap water W1 stored in the reactor 10, jets high-pressure water W2 into the tap water W1 to jet a water jet. Accordingly, a circular vortex is generated in the water jet. A nucleus (cavitation nucleus) is generated in the circular vortex. When the pressure at the center of the nucleus reaches a saturated vapor pressure at the temperature of the water jet, flow cavitation is generated.

Here, the ultrasonic wave applying element 30 applies the ultrasonic wave U1 to flow cavitation generated by jetting of the water jet. Accordingly, the pressure repeatedly increases and decreases in the flow cavitation. Thus, generation of the nucleus, diffusion and expansion of the nucleus, pressure collapse of the nucleus and generation of the nucleus repeatedly occur. In this repetition, diffusion and expansion of the nucleus coincides with generation of the nucleus, so that flow cavitation including high-temperature reaction fields (hot spots), i.e. cavitation (mechanical and electrochemical cavitation MFC) having both a functional effect and an electrochemical effect is generated.

When pressure collapse of the multifunction cavitation MFC is started, the multifunction cavitation MFC is close to titanium oxide, platinum or the like as a substance. The volume of the multifunction cavitation MFC is decreased to generate a high-speed jet (micro-jet) that would stick to a substance surface. The high-speed jet (micro-jet) generated by the multifunction cavitation MFC collides with a titanium oxide powder, a platinum powder or the like flowing into the water jet with a sub-flow passing through the substance inflow channel 24. Accordingly, mechanical and electrochemical surface reforming by a micro-jet for changing the geometric shape and the electrochemical properties of surfaces of titanium oxide, platinum and the like is performed.

Thus, high-temperature reaction fields included in flow cavitation and generated by expansion/shrinkage of the flow cavitation by the ultrasonic wave U1 are distributed in front of the jetting nozzle 20 in the water jet jetting direction because the ultrasonic wave applying element 30 applies the ultrasonic wave U1 to the jetted water jet as described above.

Figure 5:
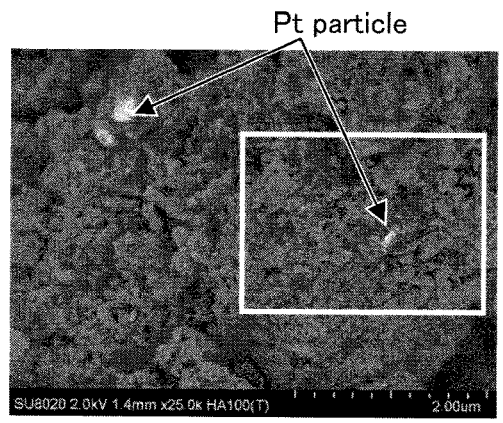
FIG. 5 is a field emission-type scanning electron microscope (FE-SEM) photograph showing a surface of titanium oxide which is made porous and made to hold platinum in an enveloping manner by mechanical and electrochemical cavitation in embodiment 1 according to the present invention.
Figure 6:
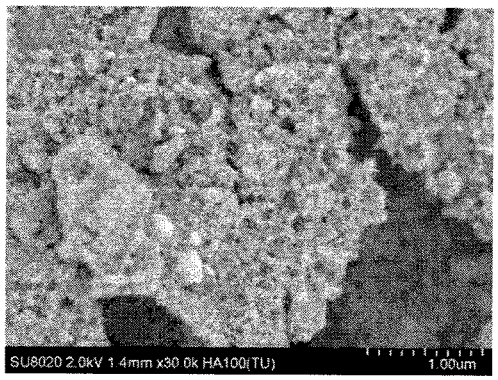
FIG. 6 is a field emission-type scanning electron microscope (FE-SEM) photograph showing a surface of titanium oxide which is made porous and made to hold platinum in an enveloping manner by mechanical and electrochemical cavitation MFC in embodiment 1 according to the present invention.
Figure 7:
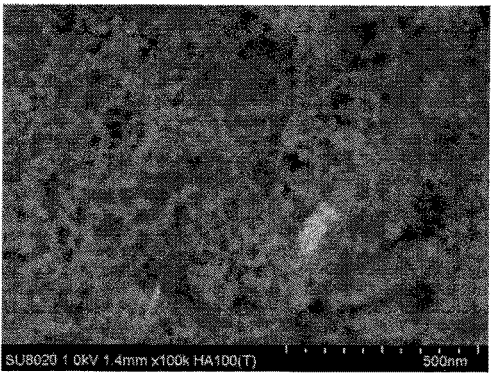
FIG. 7 is a field emission-type scanning electron microscope (FE-SEM) photograph showing a surface of titanium oxide which is made porous and made to hold platinum in an enveloping manner by mechanical and electrochemical cavitation MFC in embodiment 1 according to the present invention.
Figure 8:
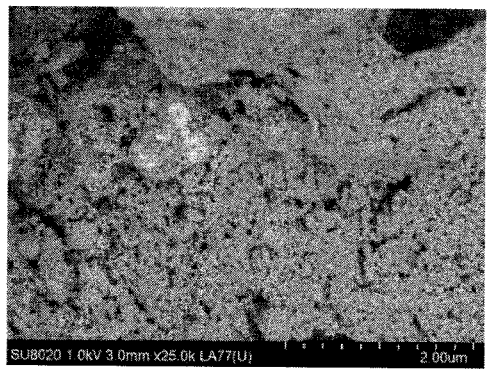
FIG. 8 is a field emission-type scanning electron microscope (FE-SEM) photograph showing a surface of titanium oxide which is made porous and made to hold platinum in an enveloping manner by mechanical and electrochemical cavitation MFC in embodiment 1 according to the present invention.
Figure 9:
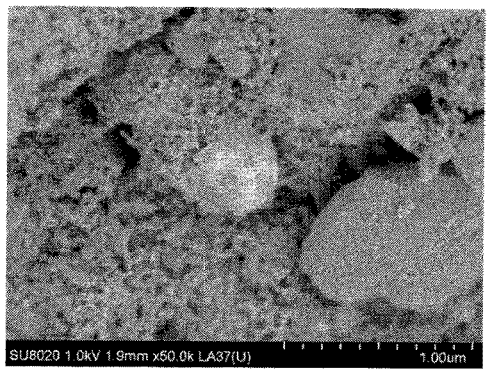
FIG. 9 is a field emission-type scanning electron microscope (FE-SEM) photograph showing a surface of titanium oxide which is made porous and made to hold platinum in an enveloping manner by mechanical and electrochemical cavitation MFC in embodiment 1 according to the present invention.

Next, multifunction cavitation MFC is generated according to this embodiment to perform surface reforming of the titanium oxide powder. The results of subjecting a surface of titanium oxide to mechanical and electrochemical surface reforming are as shown in FIGS. 5 to 9. FIG. 5 is a field emission-type scanning electron microscope (FE-SEM) photograph showing a surface of titanium oxide which is made porous and made to hold platinum in an enveloping manner by mechanical and electrochemical cavitation in embodiment 1 according to the present invention. FIG. 6 is a field emission-type scanning electron microscope (FE-SEM) photograph showing a surface of titanium oxide which is made porous and made to hold platinum in an enveloping manner by mechanical and electrochemical cavitation MFC in embodiment 1 according to the present invention. FIG. 7 is a field emission-type scanning electron microscope (FE-SEM) photograph showing a surface of titanium oxide which is made porous and made to hold platinum in an enveloping manner by mechanical and electrochemical cavitation MFC in embodiment 1 according to the present invention. FIG. 8 is a field emission-type scanning electron microscope (FE-SEM) photograph showing a surface of titanium oxide which is made porous and made to hold platinum in an enveloping manner by mechanical and electrochemical cavitation MFC in embodiment 1 according to the present invention. FIG. 9 is a field emission-type scanning electron microscope (FE-SEM) photograph showing a surface of titanium oxide which is made porous and made to hold platinum in an enveloping manner by mechanical and electrochemical cavitation MFC in embodiment 1 according to the present invention.

Conditions of generation of multifunction cavitation MFC are as described below.
(Conditions for generation of multifunction cavitation MFC)
Pressure of high-pressure water supplied from high-pressure supply source to jetting nozzle 20: 35 MPa
Time for application of ultrasonic wave U1 and jetting of water jet: 2 minutes
Frequency of ultrasonic wave U1: 28 kHz
Ultrasonic wave output rated value: 225 W
Distance between water jet and ultrasonic wave applying element 30: 54 mm As shown in FIGS. 5 to 9, a surface of titanium oxide which is subjected to mechanical and electrochemical surface reforming is made porous and provided with a large number of nm (nanometer)-sized deep pores. As shown by an arrow in FIG. 5, platinum particles (white part) are supported by titanium oxide (dark gray part) with the platinum particles enveloped in the titanium oxide. It is apparent that similar states are shown in FIGS. 6 to 9.

Figure 10:
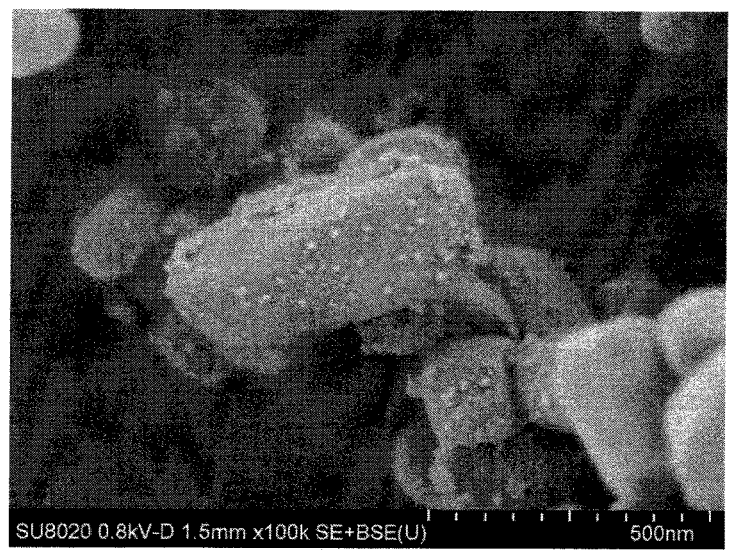
FIG. 10 is a field emission-type scanning electron microscope (FE-SEM) photograph showing a surface of titanium oxide on which platinum is deposited by flow cavitation.

On the other hand, the result of subjecting titanium oxide to surface reforming by flow cavitation generated by a water jet under the same conditions except that the ultrasonic wave U1 is not applied is as shown in FIG. 10. FIG. 10 is a field emission-type scanning electron microscope (FE-SEM) photograph showing a surface of titanium oxide on which platinum is deposited by flow cavitation. It is apparent that the surface of titanium oxide which is subjected to surface reforming by flow cavitation as shown in FIG. 10 is not as porous as the surfaces of titanium oxide shown in FIGS. 5 to 9. It is also apparent that the platinum particles are deposited on the surface of titanium oxide, and this state is markedly different from the state in which the platinum particles are supported by the titanium oxide with the platinum particles enveloped in the titanium oxide.

Figure 11:
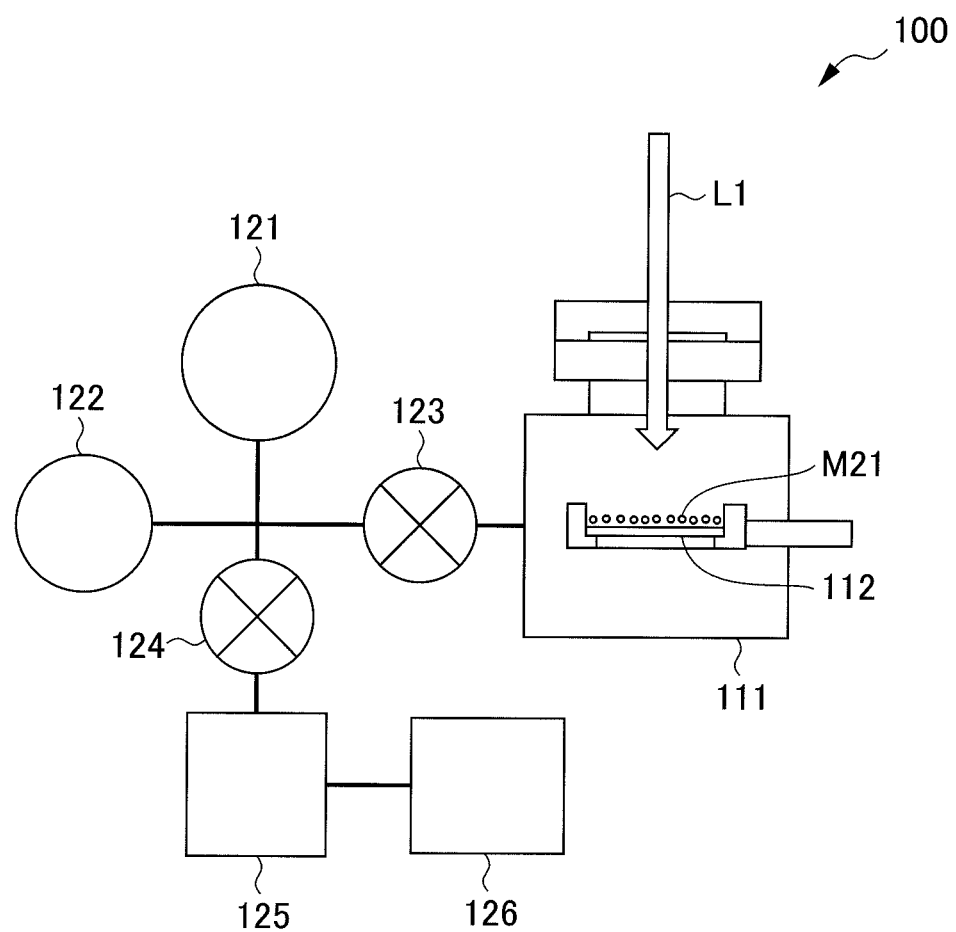
FIG. 11 is a schematic view showing a state in which an effect test is conducted using a Q mass apparatus (quadruple mass spectrometer (QMS) apparatus) 100 for a titanium oxide powder etc. which is surface-treated by the method for generating mechanical and electrochemical cavitation MFC in embodiment 1 according to the present invention.

Next, using a titanium oxide powder etc. subjected to surface reforming as described above by multifunction cavitation MFC in this embodiment, water is decomposed to generate hydrogen and oxygen. Specifically, in decomposition of water, titanium oxide powders etc. (invention products 1 to 4, comparative products 1 to 4, conventional product) subjected to surface reforming are immersed in tap water, and disposed in low vacuum in a Q mass apparatus (quadruple mass spectrometer (QMS) apparatus) 100 shown in FIG. 11. FIG. 11 is a schematic view showing a state in which an effect test is conducted using the Q mass apparatus (quadruple mass spectrometer (QMS) apparatus) 100 for the titanium oxide powder etc. which is surface-treated by the method for generating mechanical and electrochemical cavitation MFC in embodiment 1 according to the present invention. These powders are each irradiated with visible light L1 or ultraviolet light L1 for 1 hour, and the amounts of generated hydrogen and oxygen are measured.

The Q mass apparatus 100 includes a main vacuum chamber 111, a quadruple mass spectrometer 121, an ionization vacuum gauge 122, valves 123 and 124, a turbomolecular pump 125 and a rotary pump 126. Titanium oxide powders etc. (invention products 1 to 4, comparative products 1 to 4 and conventional product) immersed in tap water are disposed on quartz glass 112 disposed in the main vacuum chamber 111.

The quadruple mass spectrometer 121 and the ionization vacuum gauge 122 communicate with the main vacuum chamber 111, and the valve 123 is connected between the quadruple mass spectrometer 121 and ionization vacuum gauge 122 and the main vacuum chamber 111. The turbomolecular pump 125 and the rotary pump 126 communicate in this order with the quadruple mass spectrometer 121, the ionization vacuum gauge 122 and the main vacuum chamber 111 through the valve 124.

As an internal standard substance, a certain amount of helium or argon is injected into the main vacuum chamber 111 beforehand. The valves 123 and 124 are opened by an appropriate amount, and evacuation is performed in a certain amount by the turbomolecular pump 125. Titanium oxide powders etc. ((invention products 1 to 4, comparative products 1 to 4, conventional product) subjected to surface reforming are irradiated with visible light or ultraviolet light for 1 hour. Meanwhile, the current value for each of hydrogen and oxygen ionized in the main vacuum chamber 111 is measured in the quadruple mass spectrometer 121. A contribution of hydrogen (H) in water molecule is subtracted on the basis of the pattern coefficient of hydrogen (H) from the water molecule ($H_2O$) to measure the generation rate of hydrogen ($H_2$) generated by decomposition of water, and the generation rate of oxygen ($O_2$) per unit time. The invention products 1 to 4, comparative products 1 to 4 and conventional product used for generation of hydrogen and oxygen by decomposition of water are as described below.

Using the apparatus in embodiment 1, the invention product 1 is obtained in the following manner: 90.9% by weight of a powder of titanium oxide ($TiO_2$) having a crystal structure of rutile type and 9.1% by weight of a powder of platinum are made to flow into a water jet with a sub-flow passing through the substance inflow channel 24, and these substances are subjected to surface reforming. The surface reforming is performed by the method for generating mechanical and electrochemical cavitation in embodiment 1.

Using the apparatus in embodiment 1, the invention product 2 is obtained in the following manner: 100% by weight of a powder of titanium oxide ($TiO_2$) having a crystal structure of rutile type is made to flow into a water jet with a sub-flow passing through the substance inflow channel 24, and this substance is subjected to surface reforming. The surface reforming is performed by the method for generating mechanical and electrochemical cavitation in embodiment 1.

Using the apparatus in embodiment 1, the invention product 3 is obtained in the following manner: 90.9% by weight of a powder of titanium oxide ($TiO_2$) having a crystal structure of rutile type and 9.1% by weight of a powder of nickel (II) oxide (NiO) are made to flow into a water jet with a sub-flow passing through the substance inflow channel 24, and these substances are subjected to surface reforming. The surface reforming is performed by the method for generating mechanical and electrochemical cavitation in embodiment 1.

Using the apparatus in embodiment 1, the invention product 4 is obtained in the following manner: 90.9% by weight of a powder of titanium oxide ($TiO_2$) having a crystal structure of anatase type and 9.1% by weight of a powder of platinum are made to flow into a water jet with a sub-flow passing through the substance inflow channel 24, and these substances are subjected to surface reforming. The surface reforming is performed by the method for generating mechanical and electrochemical cavitation in embodiment 1.

Using the apparatus in embodiment 1, the comparative product 1 is obtained in the following manner: 90.9% by weight of a powder of titanium oxide ($TiO_2$) having a crystal structure of rutile type and 9.1% by weight of a powder of platinum are made to flow into tap water W1, irradiated with the ultrasonic wave U1 for 2 minutes, and these are then exposed to flow cavitation generated by a water jet for 2 minutes, whereby surface reforming of these substances is performed.

Using the apparatus in embodiment 1, the comparative product 2 is obtained in the following manner: 90.9% by weight of a powder of titanium oxide ($TiO_2$) having a crystal structure of rutile type and 9.1% by weight of a powder of platinum are made to flow into a water jet with a sub-flow passing through the substance inflow channel 24, and surface reforming of these substances is performed. Using the apparatus in embodiment 1, the surface reforming is performed in the following manner: the powder of titanium oxide and the powder of platinum are made to flow into a water jet with a sub-flow passing through the substance inflow channel 24, and are exposed for 2 minutes to flow cavitation generated by the water jet, and the powder of titanium oxide and the powder of platinum are then irradiated for 2 minutes with the ultrasonic wave U1 used for mechanical and electrochemical cavitation in embodiment 1.

Using the apparatus in embodiment 1, the comparative product 3 is obtained in the following manner: 90.9% by weight of a powder of titanium oxide ($TiO_2$) having a crystal structure of rutile type and 9.1% by weight of a powder of platinum are made to flow into a water jet with a sub-flow passing through the substance inflow channel 24, and surface reforming of these substances is performed. Using the apparatus in embodiment 1, the surface reforming is performed in the following manner: the powder of titanium oxide and the powder of platinum are made to flow into a water jet with a sub-flow passing through the substance inflow channel 24, and are exposed only to flow cavitation generated by the water jet for 2 minutes.

Using the apparatus in embodiment 1, the comparative product 4 is obtained in the following manner: 90.9% by weight of a powder of titanium oxide ($TiO_2$) having a crystal structure of rutile type and 9.1% by weight of a powder of platinum are mixed in tap water W1, and irradiated with the ultrasonic wave U1. The surface reforming is performed by irradiating the powder of titanium oxide and the powder of platinum for 2 minutes only with the ultrasonic wave U1 used for mechanical and electrochemical cavitation in embodiment 1.

The conventional product is obtained in the following manner: 99.9% by weight of a powder of titanium oxide ($TiO_2$) having a crystal structure of anatase type and 0.1% by weight of a powder of platinum are stirred with a rotor (stirring bar) while being irradiated with ultraviolet light using a high-pressure mercury lamp, whereby these substances are subjected to surface reforming. The stirring time is 8 hours.

The mass of each of the above-mentioned invention products 1 to 4, comparative products 1 to 4, and conventional product is 1.0 g. The results are shown in Table 1 for application of visible light, and in Table 2 for application of ultraviolet light.

product. Particularly, hydrogen can be obtained in an amount larger by a factor of 25 or more with the invention product 1 than with the conventional product.

TABLE 1

Comparison of water decomposition amount (under irradiation with visible light)

| | Invention product 1 | Invention product 2 | Invention product 3 | Invention product 4 | Comparative product 1 | Comparative product 2 | Comparative product 3 | Comparative product 4 | Conventional product |
|---|---|---|---|---|---|---|---|---|---|
| $H_2$ generation rate ($\mu$molh$^{-1}$) | 267.2 | 16.4 | 6.6 | 63.8 | 46.5 | 66.9 | 64.5 | 64.2 | — |
| $O_2$ generation rate ($\mu$molh$^{-1}$) | 136.7 | 7.7 | 3.0 | 31.7 | 22.0 | 40.3 | 30.9 | 23.1 | — |

TABLE 2

Comparison of water decomposition amount (under irradiation with ultraviolet light)

| | Invention product 1 | Invention product 2 | Invention product 3 | Invention product 4 | Comparative product 1 | Comparative product 2 | Comparative product 3 | Comparative product 4 | Conventional product |
|---|---|---|---|---|---|---|---|---|---|
| $H_2$ generation rate ($\mu$molh$^{-1}$) | 2738 | 253 | 786 | 3628 | 477 | 686 | 661 | 657 | 106 |
| $O_2$ generation rate ($\mu$molh$^{-1}$) | 1480 | 129 | 389 | 1314 | 258 | 371 | 357 | 355 | 51 |

With the conventional product, hydrogen and oxygen from decomposition of water cannot be obtained only by application of visible light as shown in Table 1. On the other hand, it is apparent that with any of the invention products 1 to 4, hydrogen and oxygen from decomposition of water can be obtained by application of visible light.

It is apparent from Table 1 that for the invention products 1 to 3, hydrogen and oxygen from decomposition of water can be obtained in a much larger amount with the invention product 1 including a powder of titanium oxide ($TiO_2$) and 9.1% by weight of a powder of platinum than with the invention product 2 including only titanium oxide ($TiO_2$) and the invention product 3 including a powder of titanium oxide ($TiO_2$) and 9.1% by weight of a powder of nickel (II) oxide (NiO).

It is apparent from Table 1 that for the invention products 1 and 4, hydrogen and oxygen from decomposition of water can be obtained in a larger amount with the invention product 1 including titanium oxide having a crystal structure of rutile type than with the invention product 4 including titanium oxide having a crystal structure of anatase type.

It is apparent from Table 1 that for the invention product 1 and comparative products 1 to 4 each including 90.9% by weight of a powder of titanium oxide ($TiO_2$) having a crystal structure of rutile type and 9.1% by weight of a powder of platinum, hydrogen and oxygen from decomposition of water can be obtained in an amount larger by a factor of 3 or more with the invention product 1 subjected to surface reforming by multifunction cavitation MFC than with the comparative products 1 to 4 which are not subjected to surface reforming by multifunction cavitation MFC.

With the conventional product, hydrogen and oxygen from decomposition of water can be obtained in only a slight amount by application of ultraviolet light as shown in Table 2. On the other hand, it is apparent that hydrogen and oxygen from decomposition of water can be obtained in a much larger amount by application of ultraviolet light with any of the invention products 1 to 4 than with the conventional product.

It is apparent from Table 2 that for the invention products 1 to 3, hydrogen and oxygen from decomposition of water can be obtained in a much larger amount with the invention product 1 including a powder of titanium oxide ($TiO_2$) and 9.1% by weight of a powder of platinum than with the invention product 2 including only titanium oxide ($TiO_2$) and the invention product 3 including a powder of titanium oxide ($TiO_2$) and a powder of 9.1% by weight of a powder of nickel (II) oxide (NiO).

It is apparent from Table 2 that for the invention products 1 and 4, the result in application of ultraviolet light is reverse to the result in application of visible light so far as hydrogen is concerned. Specifically, hydrogen from decomposition of water can be obtained in a larger amount with the invention product 4 including titanium oxide having a crystal structure of anatase type than with the invention product 1 including titanium oxide having a crystal structure of rutile type. So far as oxygen is concerned, the result in application of ultraviolet light is similar to the result in application of visible light.

It is apparent from Table 2 that for the invention product 1 and comparative products 1 to 4 each including 90.9% by weight of a powder of titanium oxide ($TiO_2$) having a crystal structure of rutile type and 9.1% by weight of a powder of platinum, hydrogen and oxygen from decomposition of water can be obtained in an amount larger by a factor of 3 or more with the invention product 1 subjected to surface reforming by multifunction cavitation MFC than with the comparative products 1 to 4 which are not subjected to surface reforming by multifunction cavitation MFC.

The method for generating mechanical and electrochemical cavitation in embodiment 1 exhibits the following effects. As described above, the method for generating mechanical and electrochemical cavitation includes: jetting a water jet from the jetting nozzle 20 immersed in water; and applying the ultrasonic wave U1 to flow cavitation, which is generated by the jetting of the water jet, at a position where the flow cavitation is expandable and the flow velocity of the flow cavitation is equal to or less than a predetermined moving velocity, and distributing high-temperature reaction fields, which are included in the flow cavitation and generated by repeated expansion/shrinkage resulting from the application of the ultrasonic wave U1, in such a manner that the high-temperature reaction fields are situated away from the jetting nozzle 20.

With the configuration described above, at the time when by application of the ultrasonic wave U1, the nucleus of flow cavitation is diffused/expanded, and then shrunk to cause pressure collapse of the nucleus, the volume of the flow cavitation is decreased, so that a high-speed jet which would stick to a solid surface of a substance such as titanium oxide can be generated to promote surface reforming of a substance such as titanium oxide. Accordingly, for example, the surface of titanium oxide can be made porous, and on the porous surface of titanium oxide, platinum can be supported by titanium oxide with platinum particles enveloped in the titanium oxide. A photocatalyst capable of effectively decomposing water into hydrogen and oxygen not only by ultraviolet light but also by visible light can be obtained.

The moving velocity of the flow cavitation is 5 m/s or less. With this configuration, the Blake threshold $A_{Blake}$ can be made equal to 1 bar (atmospheric pressure), and it is possible to easily expand the nucleus of the cavitation.

The frequency of the ultrasonic wave U1 is 20 kHz or more and 33 kHz or less. With this configuration, the ultrasonic wave U1 of a frequency similar to the resonant frequency of a bubble having a size of 100 µm or more, which is the size of water jet cavitation, can be applied to flow cavitation. As a result, the nucleus of cavitation can be easily expanded. Accordingly, the method for generating mechanical and electrochemical cavitation MFC can be carried out using any frequency in the frequency band of the ultrasonic wave U1.

The distance between the water jet and the ultrasonic wave applying element 30 for applying the ultrasonic wave U1 is equal to or less than five times the wavelength of the ultrasonic wave U1. With this configuration, the ultrasonic wave U1 can be applied to the water jet with sufficient intensity. As a result, mechanical and electrochemical cavitation MFC can be effectively generated.

In the method for changing the geometric shape and the electrochemical properties of a surface of a substance, mechanical and electrochemical cavitation MFC generated by the method for generating mechanical and electrochemical cavitation is collided with titanium oxide and platinum as substances.

With the configuration described above, not only surfaces of titanium oxide and platinum can be made porous by multifunction cavitation MFC, and mechanically (geometrically) changed, but also the band gap can be reduced to change the band structure, leading to an improvement of energy conversion efficiency. Specifically, when titanium oxide ($TiO_2$) is used as a semiconductor electrode, platinum (Pt) is used as a metal electrode, and the semiconductor electrode is irradiated with ultraviolet light, oxygen ($O_2$) is generated from the semiconductor electrode and hydrogen ($H_2$) is generated from the metal electrode in accordance with the Honda-Fujishima effect. Here, an external bias voltage of about −0.5 V should be applied to the metal electrode, but water is decomposed into hydrogen and oxygen at a voltage much lower than the theoretical electrolysis voltage of water: 1.23 V. When a semiconductor electrode including titanium oxide and a metal electrode including platinum are subjected to a surface treatment by multifunction cavitation MFC, water can be photolyzed without involving a bias voltage. Hydrogen can be generated with high energy conversion efficiency not only by application of ultraviolet light but also by application of visible light (solar light). Function enhancement by surface reforming of a substance by multifunction cavitation MFC is applicable not only to titanium oxide and platinum but also to substances in other fields.

The substance includes at least one selected from titanium oxide having a crystal structure of rutile type or anatase type, platinum and nickel (II) oxide. The particles of titanium oxide have a particle size of 100 nm or more and 400 nm or less. The particles of platinum or nickel (II) oxide have a particle size of 0.1 µm or more and 85 µm or less. With this configuration, a semiconductor electrode and a metal electrode with high energy conversion efficiency can be formed as a semiconductor electrode and a metal electrode in decomposition of water into hydrogen and oxygen by a photocatalyst.

(Embodiment 2)

Figure 12:
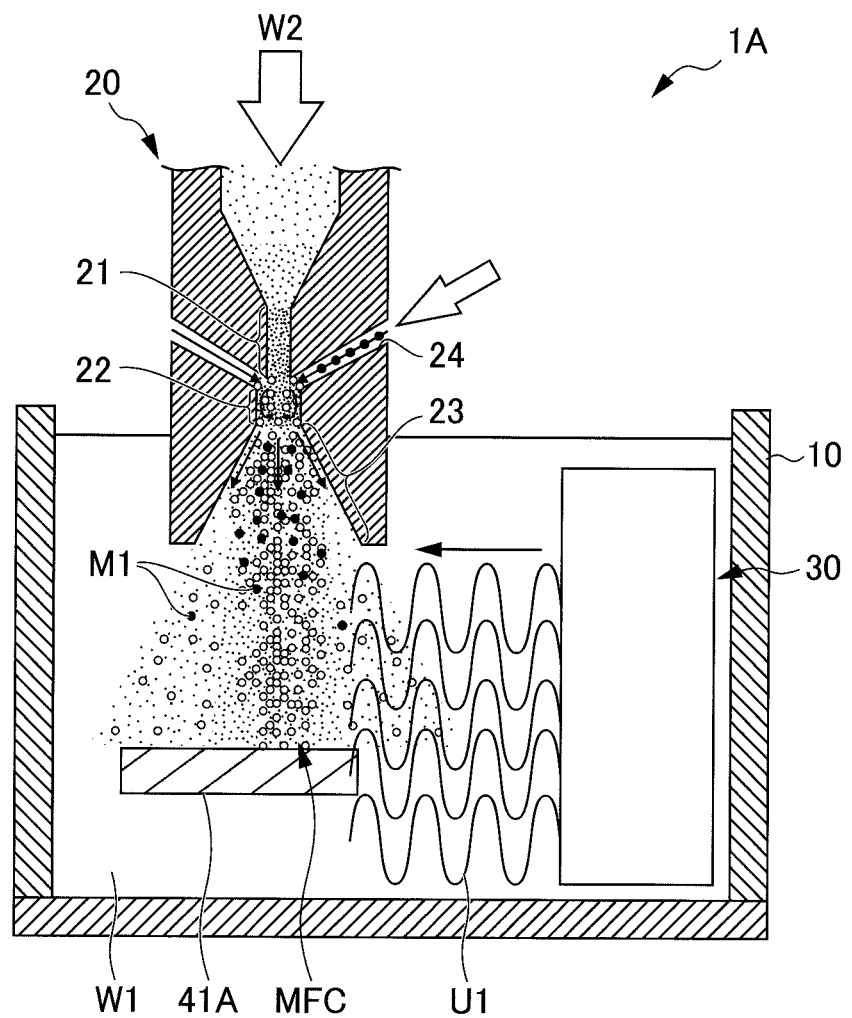
FIG. 12 is a schematic view showing a method for generating mechanical and electrochemical cavitation MFC in embodiment 2 according to the present invention.

A method for generating mechanical and electrochemical cavitation according to the present invention will now be described. Embodiment 2 is different from embodiment 1 in that a water jet is jetted to and collided with a collision object. Otherwise, embodiment 2 is identical to embodiment 1, and descriptions of matters identical to those in embodiment 1 are omitted. Like members are given like symbols. FIG. 12 is a schematic view showing the method for generating mechanical and electrochemical cavitation MFC in embodiment 2 according to the present invention.

As shown in FIG. 12, a collision object 41A includes, for example, a flat plate or curved plate of stainless steel. Conditions for generation of multifunction cavitation MFC are identical to those in embodiment 1. The water jet is jetted to and collided with the upper surface of the collision object 41A shown in FIG. 12. Accordingly, a secondary jet flow is generated on the periphery of the collision object 41A on the upper side, and the flow velocity of water with the water jet is decreased to reduce the pressure. In the same manner as in embodiment 1, the ultrasonic wave U1 is applied to the water jet with the flow velocity decreased to reduce the pressure as described above, and as a result, multifunction cavitation MFC is generated.

The method for generating mechanical and electrochemical cavitation in embodiment 2 exhibits the following effects. By applying an ultrasonic wave U1 to flow cavitation of a secondary jet flow generated on the periphery of the collision object 41A by a water jet jetted from a jetting nozzle 20 colliding with the collision object 41A as described above, high-temperature reaction fields of the flow cavitation including the high-temperature reaction fields are generated on the periphery of the collision object 41A. With this configuration, the pressure of the water jet can be properly reduced, and as a result, multifunction cavitation MFC can be generated with high efficiency.

(Embodiment 3)

A method for changing the geometric shape and the electrochemical properties of a surface of a substance according to embodiment 3 of the present invention will now be described. Embodiment 3 is different from embodiment 1 in that as a substance to be subjected to surface reforming, a substance which is required to have low gas adsorption and high oxidation resistance and corrosion resistance is used in place of titanium oxide and platinum. Otherwise, embodiment 3 is identical to embodiment 2, and descriptions of matters identical to those in embodiment 2 are omitted. Like members are given like symbols.

As a substance to be subjected to surface reforming, for example, a plate material composed of carbon steel SS400 is used. The plate material as a substance composed of carbon steel SS400 is disposed in place of a collision object 41A at a position where the collision object 41A in embodiment 2 is disposed. With a substance inflow channel 24 closed, so that a sub-flow is not generated, a water jet flow is collided with the plate material composed of carbon steel SS400. Conditions for generation of multifunction cavitation MFC are identical to those in embodiment 1. Accordingly, mechanical and electrochemical surface reforming by multifunction cavitation MFC for changing the geometric shape and the electrochemical properties of a substance composed of carbon steel SS400 is performed. In the plate material of carbon steel SS400, an inactive surface having low gas adsorption and high oxidation resistance and corrosion resistance like a surface of stainless steel is generated.

The method for changing the geometric shape and the electrochemical properties of a surface of a substance in embodiment 3 exhibits the following effects. In the method for changing the geometric shape and the electrochemical properties of a surface of a substance, an inactive surface having low gas adsorption and high oxidation resistance and corrosion resistance is generated as a surface of carbon steel SS400 as a substance as described above. Thus, a substance which has been unable to be used because of large gas adsorption and low oxidation resistance and corrosion resistance can be effectively used as a substance having low gas adsorption and high oxidation resistance and corrosion resistance. For example, inexpensive carbon steel SS400 can be used in place of expensive stainless steel that is a substance having low gas adsorption and high oxidation resistance and corrosion resistance as described above.

(Embodiment 4)

A method for peeling off a rare metal according to embodiment 4 of the present invention will now be described. Embodiment 4 is different from embodiment 3 in that multifunction cavitation MFC acts on an ITO film which is used in a transparent electrode of a liquid crystal display. Otherwise, embodiment 4 is identical to embodiment 3, and descriptions of matters identical to those in embodiment 3 are omitted. Like members are given like symbols.

The ITO film is formed by combination of indium oxide (III) ($In_2O_3$) and tin oxide (IV) ($SnO_2$), and the melting point of the ITO film is about 1800 K to 2200 K. The ITO film is formed on a glass substrate as a covered material by vapor deposition, with the ITO film having a thickness of about 90 nm. In this way, a transparent electrode is formed. Along with the glass substrate, the ITO film is immersed in tap water W1 stored in a reactor 10 of the apparatus in embodiment 1. Along with the glass substrate, the ITO film is exposed to multifunction cavitation MFC generated by a water jet and an ultrasonic wave U1.

Figure 13:
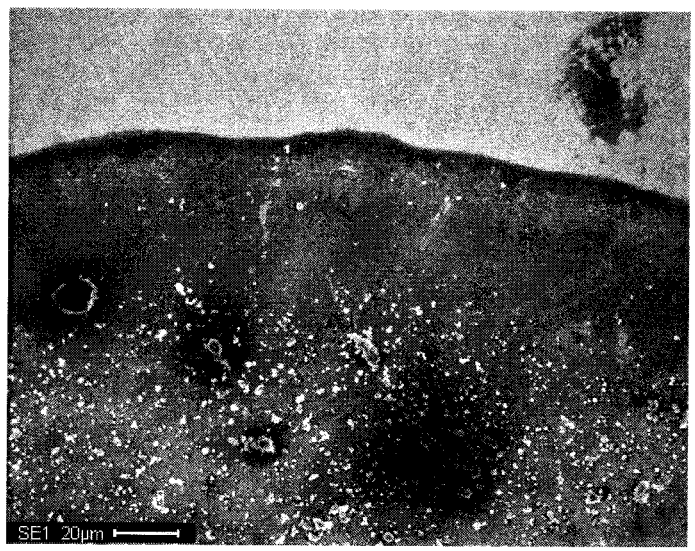
FIG. 13 is an electron microscope photograph showing a state in which an ITO film is partially peeled off by a method for peeling off a rare metal in embodiment 4 according to the present invention.

The result of exposing the ITO film to multifunction cavitation MFC is as shown in FIG. 13. FIG. 13 is an electron microscope photograph showing a state in which an ITO film is partially peeled off by the method for peeling off a rare metal in embodiment 4 according to the present invention. Conditions for generation of multifunction cavitation MFC are identical to those in embodiment 1. As shown in FIG. 13, a white part occupying about one third of FIG. 13 on the upper side corresponds to a portion of the ITO film which is not exposed to multifunction cavitation MFC. Thus, the ITO film remains on the glass substrate as it is.

On the other hand, a part occupying about two thirds of FIG. 13 on the lower side corresponds to a portion of the ITO film which is exposed to multifunction cavitation MFC. Thus, in this portion, the ITO film, and fine particles containing components of lime soda glass ($SO_2$, $NaCO_3$ and $CaCO_3$) forming the glass substrate are formed. The melting point of lime soda glass is about 1270 K, and thus it is apparent that multifunction cavitation MFC attains a high temperature exceeding the melting point of lime soda glass, and is capable of easily peeling off the ITO film composed of $In_2O_3$ and $SnO_2$ which includes a rare metal. Therefore, multifunction cavitation MFC can be effectively used for recovery of rare metals.

When together with the glass substrate, the ITO film is exposed to only flow cavitation which is not irradiated with the ultrasonic wave U1 in embodiment 1, the ITO film is not peeled off from the glass substrate, and the whole of the ITO film is in the same state as that of a part occupying about one third of FIG. 13 on the upper side.

The method for peeling off a rare metal in embodiment 4 exhibits the following effects. As described above, in the method for peeling off a rare metal, mechanical and electrochemical cavitation MFC generated by the method for generating mechanical and electrochemical cavitation in embodiment 1 is collided with a surface of glass as a covered material, on which an ITO film including a rare metal is deposited, to peel off the ITO film from the surface of glass. With this configuration, an ITO film, which is expensive, has a high melting point, is not easily peeled off from a base such as a glass substrate, and includes a rare metal, can be easily peeled off from the base, and recovered.

Figure 14:
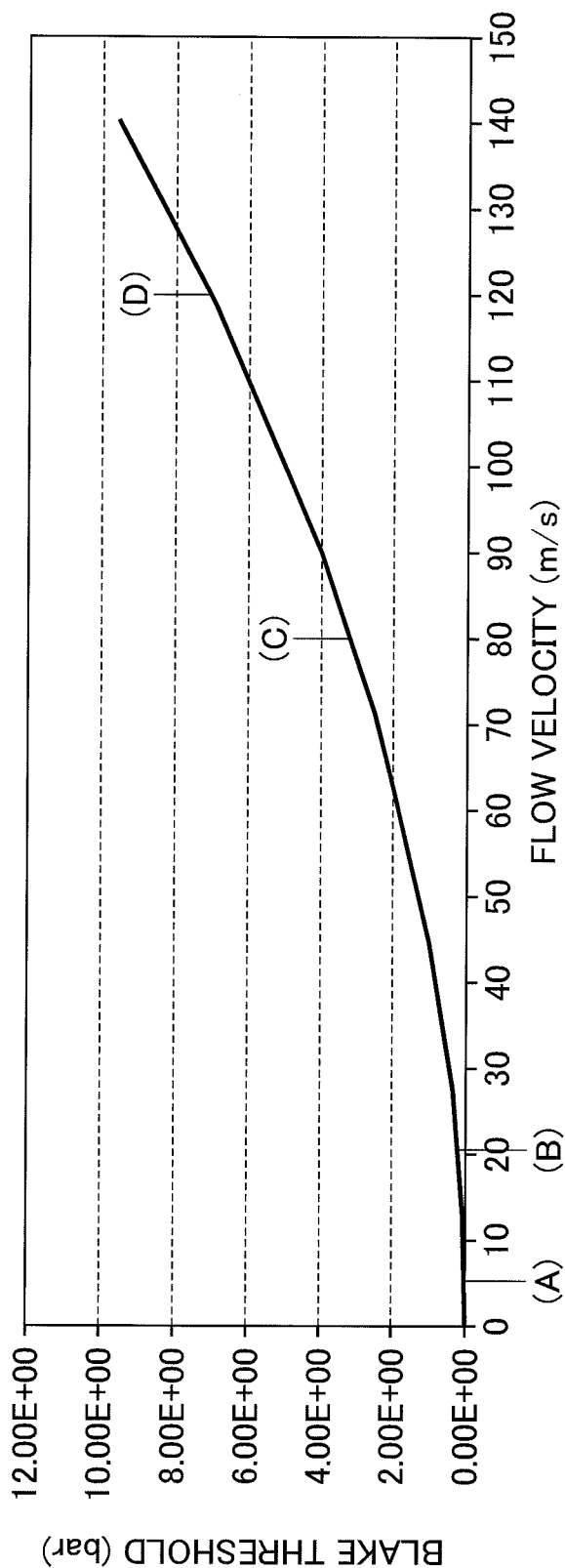
FIG. 14 is a graph showing a relationship between Blake threshold and flow velocity in a test for examining an effect of the method for generating mechanical and electrochemical cavitation MFC in embodiment 1 according to the present invention.

Next, the ITO film is peeled off while the flow velocity of flow cavitation is changed by changing the distance between the jetting nozzle 20 and the ITO film in embodiment 4. Specifically, the ultrasonic wave U1 is applied to flow cavitation at positions where the flow velocities of flow cavitation are (A) 5 m/s, (B) 21 m/s, (C) 80 m/s and (D) 120 m/s, respectively, as shown in FIG. 14, and a state in which the ITO film is peeled off is observed. Conditions for generation of multifunction cavitation MFC are identical to those in embodiment 1. FIG. 14 is a graph showing a relationship between Blake threshold and flow velocity in a test for examining an effect of the method for generating mechanical and electrochemical cavitation MFC in embodiment 1 according to the present invention.

Figure 15:
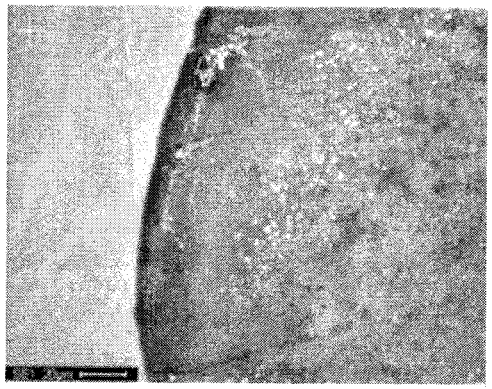
FIG. 15 is a field emission-type scanning electron microscope (FE-SEM) photograph showing test results when the flow velocity of flow cavitation is 4.5 m/s in the test for examining an effect of the method for generating mechanical and electrochemical cavitation MFC in embodiment 1 according to the present invention.
Figure 16:
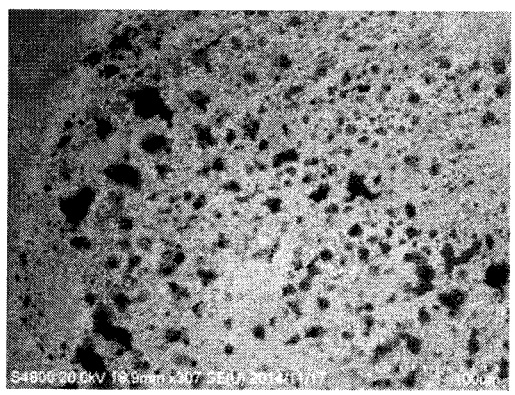
FIG. 16 is a field emission-type scanning electron microscope (FE-SEM) photograph showing test results when the flow velocity of flow cavitation is 21 m/s in the test for examining an effect of the method for generating mechanical and electrochemical cavitation MFC in embodiment 1 according to the present invention.
Figure 17:
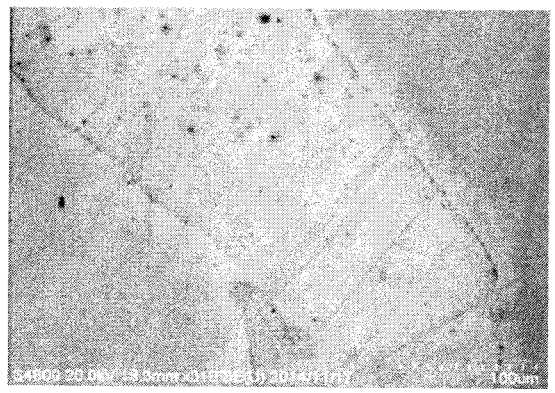
FIG. 17 is a field emission-type scanning electron microscope (FE-SEM) photograph showing test results when the flow velocity of flow cavitation is 80 m/s in the test for examining an effect of the method for generating mechanical and electrochemical cavitation MFC in embodiment 1 according to the present invention.
Figure 18:
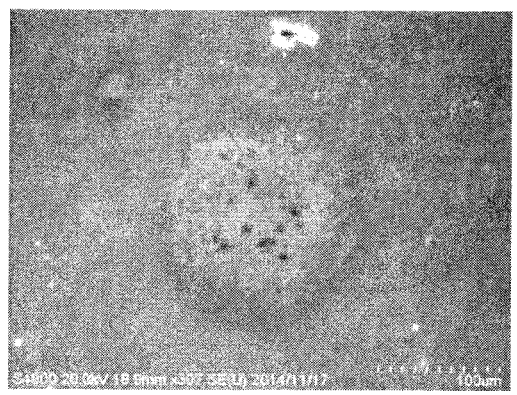
FIG. 18 is a field emission-type scanning electron microscope (FE-SEM) photograph showing test results when the flow velocity of flow cavitation is 120 m/s in the test for examining an effect of the method for generating mechanical and electrochemical cavitation MFC in embodiment 1 according to the present invention.

The obtained results are as shown in FIGS. 15 to 18. FIG. 15 is a field emission-type scanning electron microscope (FE-SEM) photograph showing test results when the flow velocity of flow cavitation is 4.5 m/s in the test for examining an effect of the method for generating mechanical and electrochemical cavitation MFC in embodiment 1 according to the present invention. FIG. 16 is a field emission-type scanning electron microscope (FE-SEM) photograph showing test results when the flow velocity of flow cavitation is 21 m/s in the test for examining an effect of the method for generating mechanical and electrochemical cavitation MFC in embodiment 1 according to the present invention. FIG. 17 is a field emission-type scanning electron microscope (FE-SEM) photograph showing test results when the flow velocity of flow cavitation is 80 m/s in the test for examining an effect of the method for generating mechanical and electrochemical cavitation MFC in embodiment 1 according to the present invention. FIG. 18 is a field emission-type scanning electron microscope (FE-SEM) photograph showing test results when the flow velocity of flow cavitation is 120 m/s in the test for examining an effect of the method for generating mechanical and electrochemical cavitation MFC in embodiment 1 according to the present invention.

As shown in FIG. 15, a white part occupying about one third of FIG. 15 on the left side corresponds to a portion of the ITO film which is not exposed to multifunction cavitation MFC when the flow velocity of flow cavitation is 5 m/s. Thus, the ITO film remains on the glass substrate as it is. On the other hand, the part occupying about two thirds of FIG. 15 on the right side corresponds to a portion of the ITO film which is exposed to multifunction cavitation MFC. Thus, in this portion, the ITO film, and fine particles containing components of lime soda glass ($SO_2$, $NaCO_3$ and $CaCO_3$) forming the glass substrate are formed. Thus, it is apparent that the ITO film composed of $In_2O_3$ and $SnO_2$ which includes a rare metal can be easily peeled off.

On the other hand, it is apparent from FIG. 16 that when the flow velocity of flow cavitation is 21 m/s, the surface of glass as a covered material on which the ITO film is deposited is reformed into a porous form, but unlike the case where the flow velocity of flow cavitation is 5 m/s, the ITO film, and fine particles containing components of lime soda glass ($SO_2$, $NaCO_3$ and $CaCO_3$) forming the glass substrate are not uniformly formed, and thus the ITO film cannot be sufficiently peeled off.

It is apparent from FIG. 17 that when the flow velocity of flow cavitation is 80 m/s, the ITO film is broken in a belt shape, but unlike the case where the flow velocity of flow cavitation is 5 m/s, the ITO film, and fine particles containing components of lime soda glass ($SO_2$, $NaCO_3$ and $CaCO_3$) forming the glass substrate are not uniformly formed, and thus the ITO film cannot be sufficiently peeled off.

It is apparent from FIG. 18 that when the flow velocity of flow cavitation is 120 m/s, the ITO film is partially broken, but unlike the case where the flow velocity of flow cavitation is 5 m/s, the ITO film, and fine particles containing components of lime soda glass ($SO_2$, $NaCO_3$ and $CaCO_3$) forming the glass substrate are not uniformly formed, and thus the ITO film cannot be sufficiently peeled off.

(Embodiment 5)

A method for generating a nuclear fusion reaction of deuterium according to embodiment 5 of the present invention will now be described. Embodiment 5 is different from embodiment 1 in that heavy water or a deuterium-containing liquid is used in place of tap water W1 and high-pressure water W2. Otherwise, embodiment 5 is identical to embodiment 1, and descriptions of matters identical to those in embodiment 1 are omitted.

Heavy water or a deuterium-containing liquid is jetted from a jetting nozzle 20 immersed in the heavy water or deuterium-containing liquid, and flow cavitation generated by the jetting of the heavy water or deuterium-containing liquid is irradiated with an ultrasonic wave U1 from an ultrasonic wave applying element 30 at a position where the flow velocity of the flow cavitation is 5 m/s or less. Accordingly, high-temperature reaction fields included in the flow cavitation and generated by repeated expansion/shrinkage resulting from the application of the ultrasonic wave are distributed in such a manner that the high-temperature reaction fields are situated away from the jetting nozzle, and a nuclear fusion reaction of deuterium is generated by collapse of the cavitation.

The method for generating mechanical and electrochemical cavitation, the method for changing the geometric shape and the electrochemical properties of a surface of a substance, the method for peeling off a rare metal, the mechanical and electrochemical cavitation generator, and the method for generating a nuclear fusion reaction according to the present invention are not limited to the above-described embodiments 1 to 4, and various modifications and changes as shown below can be made.

For example, the configuration of the apparatus to be used in the method for generating mechanical and electrochemical cavitation is not limited to the configuration of the apparatus in the embodiments described above. For example, the jetting nozzle includes a horn nozzle, but the present invention is not limited to this configuration. For example, the jetting nozzle may include a nozzle having another shape. For example, the ultrasonic wave applying element 30 applies the ultrasonic wave U1 to a vertically and downwardly jetted water jet in a horizontal direction, but the present invention is not limited to this configuration. For example, the ultrasonic wave U1 may be applied to the water jet in a direction close to a direction parallel to the water jet. In this embodiment, tap water W1 is used, but the present invention is not limited to this configuration. For example, when it is necessary to prevent a reaction with impurities such as sodium hypochlorite in water, ultrapure water or pure water may be used in place of tap water. For example, when a nuclear fusion reaction of deuterium is generated, an organic solvent such as acetone can be used in place of tap water.

In the method for generating mechanical and electrochemical cavitation in embodiment 2, the collision object 41A includes, for example, a flat plate or curved plate of stainless steel, but the present invention is not limited to this configuration. In the method for changing the geometric shape and the electrochemical properties of a surface of a substance in embodiment 3, a plate material of carbon steel SS400 is used as the substance to be subjected to surface reforming, but the present invention is not limited to this configuration. In the method for peeling off a rare metal in embodiment 4, an ITO film is peeled off from a glass substrate, but the present invention is not limited to this configuration. The rare metal is not limited to an ITO film, and the covered material is not limited to a glass substrate.

INDUSTRIAL APPLICABILITY

The present invention can be used in fields in which high-temperature reaction fields of flow cavitation are utilized. The present invention is widely applicable in, for example, fields in which a substance surface is reformed by polishing the substance surface or making the substance surface porous, and fields in which a nuclear fusion reaction is generated in high-temperature reaction fields.

EXPLANATION OF REFERENCE NUMERALS 1 mechanical and electrochemical cavitation generator
20 jetting nozzle
30 ultrasonic wave applying element
41A collision object
MFC multifunction cavitation (mechanical and electrochemical cavitation)
U1 ultrasonic wave
W1 tap water
W2 high-pressure water

The invention claimed is:

1. A method for generating mechanical and electrochemical cavitation, the method comprising: jetting a water jet from a jetting nozzle immersed in water; and applying an ultrasonic wave to flow cavitation, which is generated by the jetting of the water jet, at a position where the flow cavitation is expandable and the flow velocity of the flow cavitation is equal to or less than 5 m/s, and distributing high-temperature reaction fields, which are included in the flow cavitation and generated by repeated expansion/shrinkage resulting from the application of the ultrasonic wave, in such a manner that the high-temperature reaction fields are situated away from the jetting nozzle.

2. The method for generating mechanical and electrochemical cavitation according to claim 1, wherein the frequency of the ultrasonic wave is 20 kHz or more and 33 kHz or less.

3. The method for generating mechanical and electrochemical cavitation according to claim 1, wherein the distance between an ultrasonic wave applying element for applying the ultrasonic wave and the water jet is equal to or less than five times the wavelength of the ultrasonic wave.

4. The method for generating mechanical and electrochemical cavitation according to claim 1, wherein by applying the ultrasonic wave to flow cavitation of a secondary jet flow generated on the periphery of a collision object by the water jet jetted from the jetting nozzle colliding with the collision object, high-temperature reaction fields included in the flow cavitation are generated on the periphery of the collision object.

5. A method for changing the geometric shape and the electrochemical properties of a surface of a substance by colliding mechanical and electrochemical cavitation, which is generated by the method for generating mechanical and electrochemical cavitation according to claim 1, with the substance.

6. The method for changing the geometric shape and the electrochemical properties of a surface of a substance according to claim 5, wherein the substance includes at least one substance selected from: titanium oxide having a crystal structure of rutile type or anatase type; platinum; and, nickel oxide, wherein the titanium oxide includes particles of the titanium oxide having a particle size of 100 nm or more and 400 nm or less, wherein the platinum includes particles of having a particle size of 0.1 μm or more and 85 μm or less, and wherein the nickel oxide includes particles having a particle size of 0.1 μm or more and 85 μm or less.

7. The method for changing the geometric shape and the electrochemical properties of a surface of a substance according to claim 5, wherein, an inactive surface having low gas adsorption, and high oxidation resistance and corrosion resistance is generated as the surface of the substance.

8. A method for peeling off a metal from a surface of a covered material by colliding mechanical and electrochemical cavitation, which is generated by the method for generating mechanical and electrochemical cavitation according to claim 1, with the surface of the covered material on which the metal is deposited.

* * * * *